J. C. & M. D. BALDWIN & R. BRAYTON.
Preserving Hops.
No. 30,113. Patented Sept. 25, 1860.
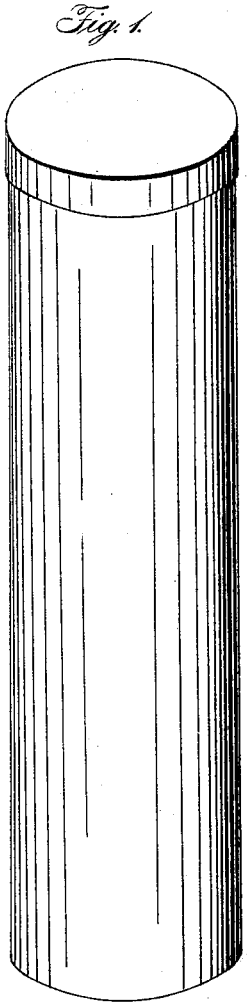
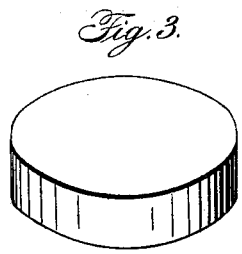
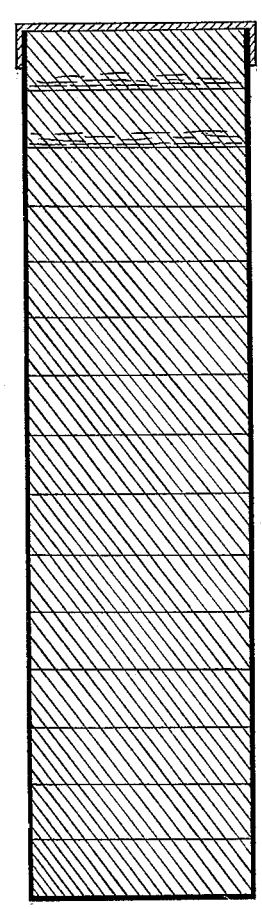
Witnesses:
W H Burridgs
Henry Voth
Inventor:
J. C. Baldwin
M. D. Baldwin
Robert Brayton

UNITED STATES PATENT OFFICE.

R. BRAYTON, OF BUFFALO, AND J. C. BALDWIN, OF WATERVILLE, NEW YORK, AND M. D. BALDWIN, OF BRANTFORD, CANADA.

PRESERVING HOPS.

Specification of Letters Patent No. 30,113, dated September 25, 1860.

*To all whom it may concern:*

Be it known that we, ROBERT BRAYTON, of Buffalo, in the county of Erie and State of New York, J. C. BALDWIN, of Waterville, in the county of Oneida and State of New York, and M. D. BALDWIN, of Brantford, in the county of Brant, Canada, West, respectfully represent that we have invented and discovered a certain new and improved mode of preserving hops, (*Humulus lupulus*,) and fitting them for storage and transportation; and we do hereby declare, that the following is a full and complete description of the said process, reference being had to the accompanying drawings, making part of this specification, in which—

Figure 1 is a package, hermetically sealed. Fig. 2 is a vertical section of the same, showing the individual cakes of which the package is composed, and Fig. 3 is an individual cake, formed in the manner hereinafter specified.

The nature of our invention and discovery, relates to an improved mode of preserving the cones or catkins of the hop, for storage and transportation, consisting in the combined processes of drying, moistening with a decoction of the plant, pressure into cakes, and subsequently making up into packages and hermetically sealing by which the natural and characteristic properties of the plant, are retained for any length of time unimpaired, in any degree of latitude, or under any atmospheric changes, or vicissitudes of weather to which they may be exposed; which is not the case in the ordinary mode of preserving hops.

There are two important principles in hops, upon which their value chiefly depends. One of these is volatile, and readily escapes if the hops are exposed to the action of the atmosphere, although impacted in canvas sacks; the other is decomposed by exposure to dampness. With the present mode of packing, both in this country and in Europe, this essential volatile principle almost entirely escapes in from three to six months. The other principle which is composed in part at least, of essential oil, is acted upon less rapidly, but there is a steady depreciation, both in flavor and strength from the first, until, at the end of two years, the hops are almost worthless. The common method of packing is by tramping with the feet in sacks. Some have added to this, as in England, the pressing of these sacks, into a more compact mass; but this simply serves to retard the process of decay, and the loss of volatile matter. Depreciation in value, as certainly, though less speedily follows.

By our method, both the volatile and other essential properties, the basis of their value and flavor, are preserved without decay, for an indefinite time, and without the least depreciation in value, under any and all atmospheric changes and vicissitudes of climate. When the cones or catkins of the hop are first gathered, they contain more or less moisture from the sap or natural juice of the plant. This we remove as much as possible, by drying slowly in a kiln, at a temperature ranging from 90° to 110° F. This low temperature is necessary in order to preserve as much as possible, the volatile matter of the hop from escaping. The loss in moisture will amount to from 10 to 15 per cent. and when thus dried, they are ready for the next step in the process.

When the hops are being gathered from the vines, the inferior catkins should be saved in a separate parcel, and the quantity thus saved, should range from five to eight or ten per cent.—that is, for every hundred pounds that are dried in the kiln, from five to eight or ten pounds of the poorest catkins should be reserved, and from this inferior quantity, a strong decoction should be made by steam, in a suitable vessel, and so concentrated that the weight will not exceed the loss in moisture sustained by those that have been dried in the kiln. A hundred pounds of good hops (subsequently dried) should now be moistened with the aforenamed decoction, or with a sufficient quantity thereof to restore the original weight before they were dried in the kiln, and immediately after being thus moistened, we subject them to the action of a powerful hydraulic press, forming them into cakes, say of five pounds each, of suitable form to be made up into larger packages, the whole mass being reduced by the above mentioned pressure in forming the cakes, to about one fiftieth of the bulk they occupy in the common mode of packing. Fig. 3 represents an individual cake thus pressed. Fig. 2 represents a number of cakes formed into a package, in which condition they are inclosed in an air tight case made of tin plate or other suitable material, and hermetically sealed. Fig. 1 represents a package thus sealed, and we find from experience, that the expense per hundred pounds when thus compressed, for furnishing cases made of tin plate, is less than the cost of furnishing canvas sacks—when the hops are baled in the common method.

The cakes and packages formed as above, and shown in Figs. 2 and 3, may be of any desired weight or form. The decoction used in moistening the catkins serves the double purpose of acting as an antiseptic, and causing by its adhesive properties, the catkins and *Lupulin* to adhere together; and the tenacity of this adhesion is so great, that the cakes will remain compressed, after the pressure is removed. The cakes thus formed can be closely packed in air tight cases as before stated, and hermetically sealed as shown in Fig. 1. Packages thus prepared can be kept for any length of time, without the least danger of injury from any vicissitudes of weather, from heat or moisture.

Particular attention must be paid to that part of the process involved in drying. If the natural moisture from the sap, and that absorbed from the atmosphere, is left in the hops, the addition of the decoction, will make them too damp, endangering their preservation free from moldiness and consequent decay. If they are kiln-dried, and pressed without the decoction, they will not become sufficiently compacted to retain their position in the cakes. Care must also be taken, in preparing and applying the decoction, which must be sufficiently concentrated to possess anti-septic properties. Care must also be taken in sealing the cases hermetically the packages, especially, if they are destined for transportation upon the ocean.

Hops preserved in this manner, can be used in the same way, as those that have been freshly gathered, for if preserved as herein set forth, they will have lost none of their virtues, even if kept for any length of time.

We are aware that leaves and other parts of vegetables have been preserved by drying and compression. We do not therefore claim these processes *per se*, but

What we claim as our invention and discovery, and desire to secure by Letters Patent, is—

The herein described process of preparing and preserving hops, substantially as set forth.

ROBERT BRAYTON.
JAS. C. BALDWIN.
M. D. BALDWIN.

Witnesses as to signature of Robert Brayton:
  W. H. BUNIDGE,
  HENRY WOTH.

Witnesses as to signature of Jas. C. Baldwin:
  G. H. CHURCH,
  DELOSS C. TERRY.

Witnesses as to signature of M. D. Baldwin:
  M. S. CARR,
  WM. H. MURPHY.